(12) United States Patent
Mangold et al.

(10) Patent No.: US 7,787,217 B2
(45) Date of Patent: Aug. 31, 2010

(54) SUSPENSION BEND SECTION WITH STIFFNESS-REDUCING FEATURES

(75) Inventors: Markus Erwin Mangold, Minneapolis, MN (US); Frederick P. Renken, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 976 days.

(21) Appl. No.: 11/144,469

(22) Filed: Jun. 2, 2005

(65) Prior Publication Data

US 2006/0274450 A1 Dec. 7, 2006

(51) Int. Cl.
*G11B 5/48* (2006.01)

(52) U.S. Cl. ............... 360/244.8; 360/244.2; 360/244.9

(58) Field of Classification Search ............. 360/244.2, 360/244.5, 244.8, 244.9, 245.2, 245.9, 294.4, 360/244.6; 52/650.1, 653.1, 634
See application file for complete search history.

(56) References Cited

U.S. PATENT DOCUMENTS

| | | | |
|---|---|---|---|
| 5,461,525 A | 10/1995 | Christianson et al. | |
| 5,877,923 A | 3/1999 | Khan et al. | |
| 5,991,122 A | 11/1999 | Tangren et al. | |
| 6,028,742 A * | 2/2000 | Kazama | 360/244.8 |
| 6,141,187 A * | 10/2000 | Wong et al. | 360/244.8 |
| 6,307,715 B1 | 10/2001 | Berding et al. | |
| 6,307,719 B1 * | 10/2001 | Mallary | 360/294.7 |
| 6,366,430 B1 * | 4/2002 | Narayan et al. | 360/244.9 |
| 6,388,842 B1 | 5/2002 | Murphy | |
| 6,532,135 B1 | 3/2003 | Chen et al. | |
| 6,556,382 B1 | 4/2003 | Tangren | |
| 6,594,902 B1 | 7/2003 | Davis | |
| 6,687,091 B1 * | 2/2004 | Chen et al. | 360/244.8 |
| 6,721,133 B2 | 4/2004 | Takagi et al. | |
| 2004/0057159 A1 * | 3/2004 | Kuwajima et al. | 360/244.2 |

\* cited by examiner

*Primary Examiner*—William J Klimowicz
*Assistant Examiner*—Carlos E Garcia
(74) *Attorney, Agent, or Firm*—Fellers, Snider, et al.

(57) ABSTRACT

An actuator load beam comprising a preload bend section defining an array of differently configured stiffness-reducing features. The stiffness-reducing features are characteristically sized in inverse relation to a respective distance from a longitudinal centerline of the actuator load beam at the preload bend section. An associated method comprising determining a thickness of a preload bend section for an actuator load beam associated with a desired resonant performance; determining a volume of stiffness-reducing features in the preload bend section associated with a desired vertical stiffness; and arranging an array of stiffness-reducing features associated with the determined volume in an array of sequentially smaller size with the largest size of the array being disposed nearest to a longitudinal centerline of the actuator load beam at the preload bend section.

16 Claims, 3 Drawing Sheets

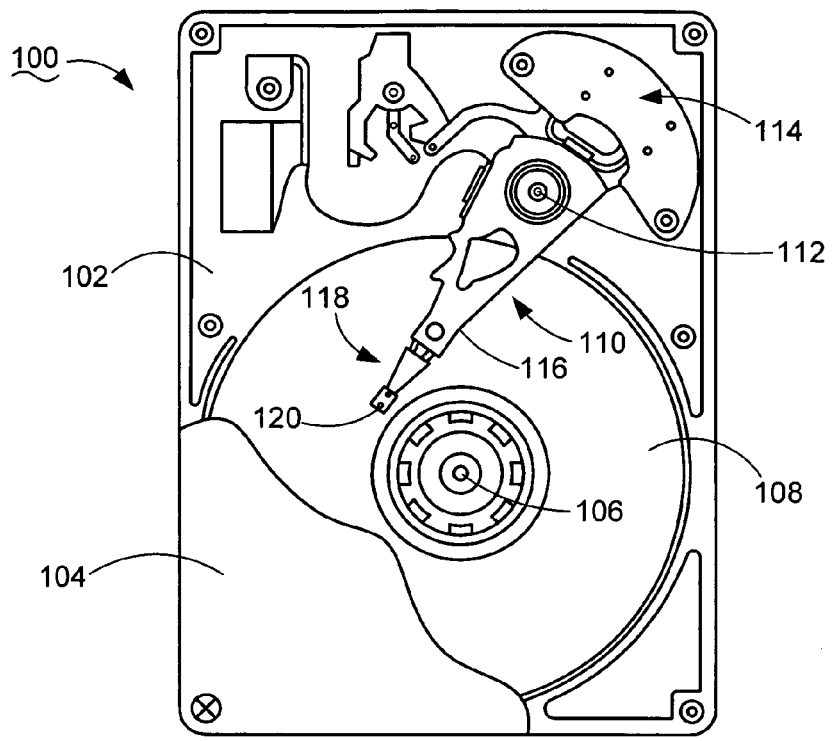
FIG. 1
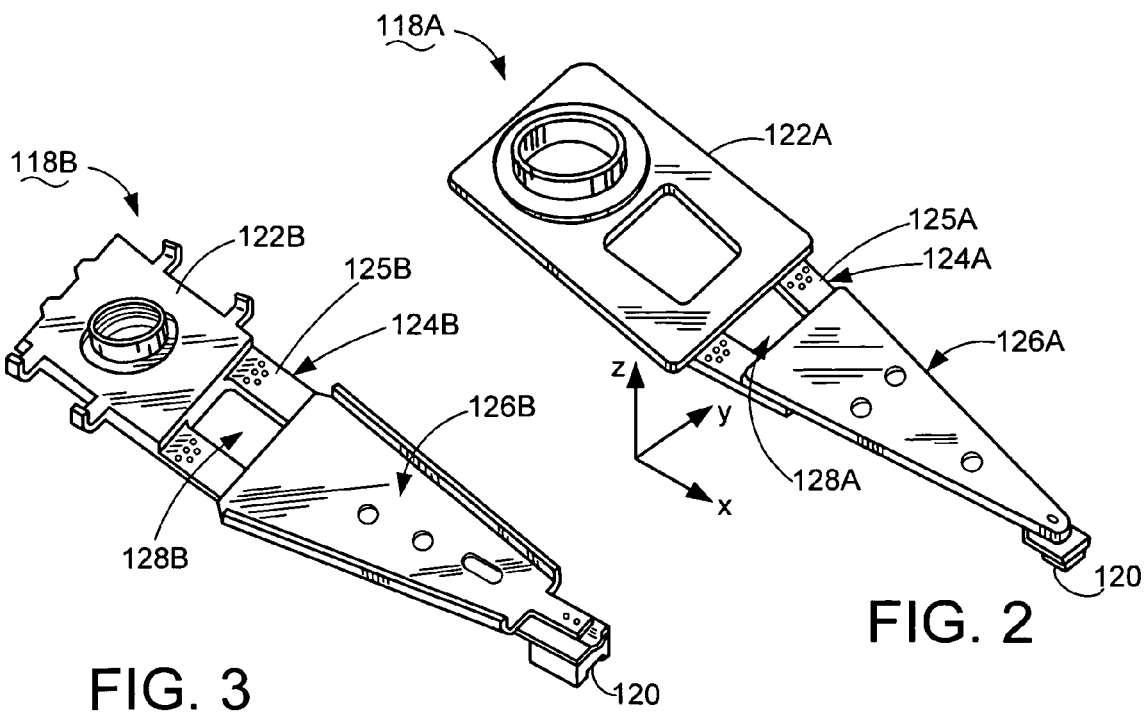
FIG. 2
FIG. 3

SUSPENSION BEND SECTION WITH STIFFNESS-REDUCING FEATURES

FIELD OF THE INVENTION

The claimed invention relates generally to the field of data storage device actuators and more particularly, but not by way of limitation, to an apparatus and method for optimizing the stiffness characteristics of an actuator suspension.

BACKGROUND

Data storage devices employ actuators to position data storing and retrieving heads with extremely abrupt accelerations and high velocities. Storage densities have dramatically increased while access times have dramatically decreased, the impact of which being that consideration of actuator resonant performance has become increasingly more important in designing for reliable data transfer.

The actuator has a flexible suspension portion involving a load beam imparting a biasing force on the head in opposition to the fluid bearing pushing the head away from the data medium. The load beam includes a preload bend section that gives the load beam a desired vertical stiffness, and around which the head articulates as the fly height varies such as during head loading and unloading. Accordingly, the vertical stiffness must be within a range permitting reliable articulation and fly performance. However, the vertical stiffness cannot be achieved at the cost of reducing resonant performance, resulting in reduced track following performance.

Particularly, reducing the material bend strength of the bend section aids in reducing the vertical stiffness, but disadvantageously also reduces the sway stiffness and torsional stiffness, resulting in resonant frequency disturbances. What is needed is a solution that employs a bend section made from a thickness that is optimized for the sway and torsional stiffness, but which is modified to likewise optimize the vertical stiffness without adversely affecting the desired sway and torsional stiffness. It is to these improvement features that the embodiments of the present invention are directed.

SUMMARY OF THE INVENTION

Embodiments of the present invention are generally directed to an actuator suspension.

In some embodiments an actuator load beam is provided comprising a preload bend section defining an array of differently configured stiffness-reducing features. The stiffness-reducing features are characteristically sized in inverse relation to a respective distance from a longitudinal centerline of the actuator load beam at the preload bend section.

A method is provided comprising determining a cross section of a preload bend section for an actuator load beam associated with a desired resonant performance; determining a volume of stiffness-reducing features in the preload bend section associated with a desired vertical stiffness; and arranging an array of stiffness-reducing features associated with the determined volume in an array of sequentially smaller sizes with the largest size of the array nearest to a longitudinal centerline of the actuator load beam at the preload bend section.

A data storage device is provided comprising an actuator in combination with a data storage medium, and means for positioning the actuator in an operable data storing and data retrieving relationship with the data storage medium. The means for positioning can be characterized by reducing the vertical stiffness of a preload bend section of the actuator in an array of stiffness-reducing features. The means for positioning can further be characterized by varying the sizes and locations of the stiffness-reducing features. The means for positioning can further be characterized by sequentially sizing the stiffness-reducing features from largest to smallest with the largest being disposed nearest a centerline of the actuator at the preload bend section. Similarly, a cross section may be constructed in which the thinnest area is near the center line and the thickness increases toward the outer edges.

These and various other features and advantages which characterize the claimed invention will become apparent upon reading the following detailed description and upon reviewing the associated drawings.

BRIEF DESCRIPTION OF THE DRAWINGS

FIG. 1 is a plan view of a data storage device constructed in accordance with embodiments of the present invention.

FIG. 2 is a flexible suspension assembly of the data storage device of FIG. 1 and constructed in accordance with embodiments of the present invention.

FIG. 3 is a flexible suspension assembly of the data storage device of FIG. 1 and constructed in accordance with alternative embodiments of the present invention.

DETAILED DESCRIPTION

Figure 4:
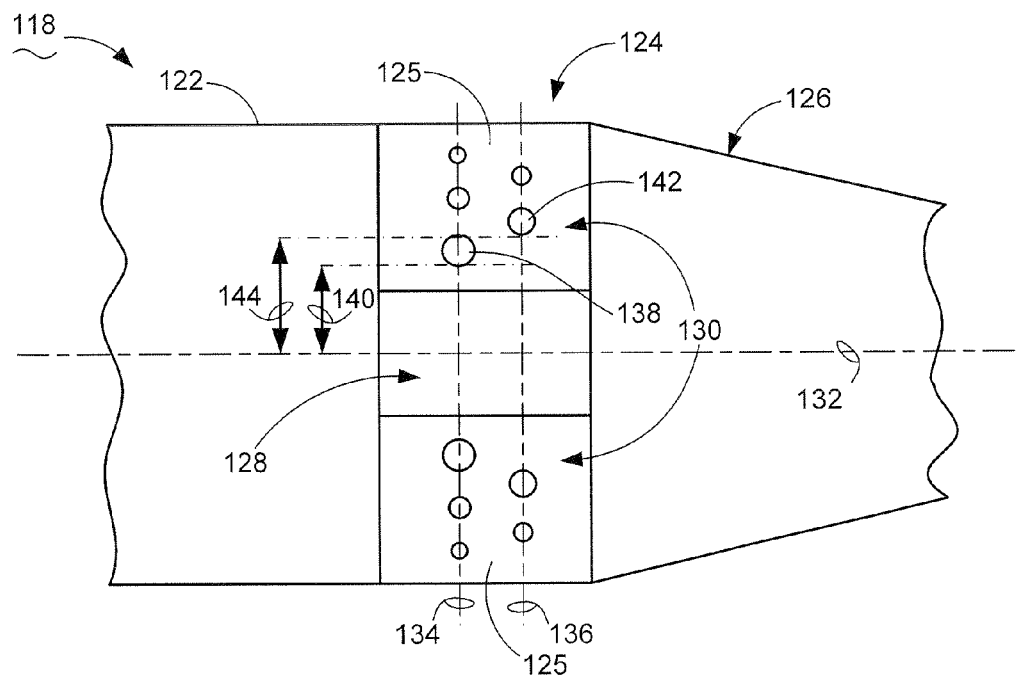
FIG. 4 is an enlarged detail view of a portion of the flexible suspension assembly of FIG. 2 or 3.

Turning to the drawings as a whole and particularly now to FIG. 1 which is a plan view of a data storage device 100 constructed in accordance with embodiments of the present invention. The data storage device 100 has a base 102 to which a cover 104 (partially cutaway) is attached with a sealing member therebetween to establish a sealed enclosure.

A spindle motor 106 is mounted to the base 102 for rotating one or more data storage mediums ("discs") 108. An actuator, such as a rotary actuator 110, has a central body (or "eblock") supported by the base 102 around a bearing 112 and pivotally moved by a voice coil motor 114. The actuator 110 has one or more rigid arms 116 extending from the body and supporting a proximal end of a flexible suspension assembly 118. The distal end of the suspension assembly 118 supports a head 120 having data storing and retrieving elements, as well as a slider assembly for flying the head 120 on a fluid bearing created by spinning the discs 108.

FIG. 2 is an isometric view of a suspension assembly 118A that is constructed in accordance with embodiments of the present invention. Generally, in these embodiments the suspension assembly 118A has a base 122A supporting a load beam 126A having a discrete preload bend section 124A. The discrete components are mechanically joined such as by welding, fusing, adhering, and the like. The bend section 124A is sometimes referred to as having a strut (or "hinge") 125A. By reducing the material width and/or thickness of the bend section 124A in comparison to the base 122A and the rest of the load beam 126A, the articulation of the head 120 around the y-axis for fly height control is determined by the bend section 124A design. In other words, the bend section 124A design determines what vertical stiffness will bias the head 120 against the fluid bearing forces. The bend section 124A design also affects the load beam 126A torsional stiffness, or resistance to rotation around the x-axis, as well as the sway stiffness, or resistance to rotation around the z-axis.

FIG. 3 illustrates a suspension assembly 118B constructed in accordance with alternative embodiments. Generally, in these embodiments the suspension assembly 118B is unitarily constructed. That is, the bend section 124B is formed by a manufacturing process, such as chemical or laser etching, to form a cavity 128B defining the opposing strut members 125B and to reduce the thickness of the strut members 125B in comparison to the base 122B and the rest of the load beam 126B.

It will be noted that in the embodiments of illustrative FIGS. 2 and 3 the base 122 defines a boss for matingly engaging a cavity in the arm 116 for swaging the suspension assembly 118 to the arm 116. In equivalent alternative embodiments (not shown) the base 122 can define a swageless connection for attachment in other ways such as fusion or adhesion.

FIG. 4 is an enlarged plan view of a portion of the suspension assembly 118. For purposes of this discussion the suspension assembly 118 of FIG. 4 can be constructed discretely, as in FIG. 2, or it can be constructed unitarily, as in FIG. 3. Designing the bend section 124 involves tradeoffs between vertical stiffness and sway/torsional stiffness. That is, if the strut members 125 are made of a thickness that optimizes the vertical stiffness, then the preload bend section 124 will most likely be too weak to withstand the sway and torsion forces without resulting in adverse resonance.

Accordingly, the embodiments of the present invention contemplate setting the thickness of the bend section 124 to optimize for sway and torsion stiffness, and then define an array of stiffness-reducing features in the bend section 124 to achieve the desired vertical stiffness without adversely affecting the sway and torsion stiffness. For purposes of this description and the appended claims, the term "stiffness-reducing feature" means in some embodiments a cavity extending partially into the bend section 124 thickness, and means in other embodiments an opening (or aperture) extending completely through the bend section 124 thickness.

In the embodiments of FIG. 4, for example, a relatively large central cavity 128 reduces the vertical stiffness without a significant adverse effect on the sway and torsion stiffness because the strut members 125 on the outer edges of the beam 126 substantially preserve the structural integrity in sway and torsion. An array 130 of additional stiffness-reducing features serves to further reduce the vertical stiffness.

From FIG. 4 it will be noted that none of the stiffness-reducing features of the array 130 coincide with a longitudinal centerline 132 of the beam 126 at the bend section 124. Rather, the features are disposed in the opposing strut members 125, and preferably are mirrored around the longitudinal centerline 132.

The total volume of the features in the array 130 is determined as being that which is necessary to achieve a desired vertical stiffness. It has been observed that providing this total volume by way of a plurality of smaller features rather than a single feature yields a more robust performance. The embodiments of FIG. 4, for example, have five stiffness-reducing features in each strut 125. In order to increase the packing density in each strut 125, therefore, the stiffness-reducing features can be arranged on each of two or more transverse planes 134, 136.

It will also be noted that the embodiments of FIG. 4 contemplate employing differently configured stiffness-reducing features in the array 130. Generally, the stiffness-reducing features are characteristically sized in inverse relation to a respective distance from the longitudinal centerline 132. For example, the feature denoted 138 is spaced a distance 140 from the centerline 132, and the relatively smaller feature denoted 142 is spaced a relatively greater distance 144 from the centerline. That is, the larger feature 138 is positioned closer to the longitudinal centerline 132. Contemplating all the features, the array 130 comprises a plurality of sequentially smaller stiffness-reducing features, the largest of the array 130 being disposed adjacent an edge of the strut 125 that is nearest to the longitudinal centerline 132.

The illustrative embodiments of FIG. 4 define five characteristically round openings as the stiffness-reducing features. These illustrative embodiments are not enumerative or in any way limiting of the equivalent alternative embodiments of the present invention, which can comprise differently configured stiffness-reducing features, such as for example rectangular or triangular features, and which can comprise a different number of the stiffness-reducing features.

In one example, the benefits of practicing the embodiments of the present invention have been observed by sizing the diameters of five openings in the range of about 0.0055 inches to about 0.009 inches, with substantially constant part-to-part variance in size, and by spacing the openings substantially equidistantly. In so doing, the resulting stiffness is made variable across the width of the bend section 124. That is, a stiffness nearer the longitudinal centerline 132 is relatively less than a stiffness nearer the outer edge of the bend section 124. For purposes of example and not by way of limitation, in developmental testing it was determined that a bend section constructed as described above and illustrated by FIG. 4, as compared to another bend section with commonly sized diameters of about 0.0087 inches and illustrated by FIG. 5, demonstrated equivalent vertical stiffness but improved torsional resonant frequency from 7.68 kHz to 7.86 kHz and improved sway resonant frequency from 20.5 kHz to 21.2 kHz. The size, number and placement of these features may vary as other design considerations merit for a given suspension.

Figure 5:
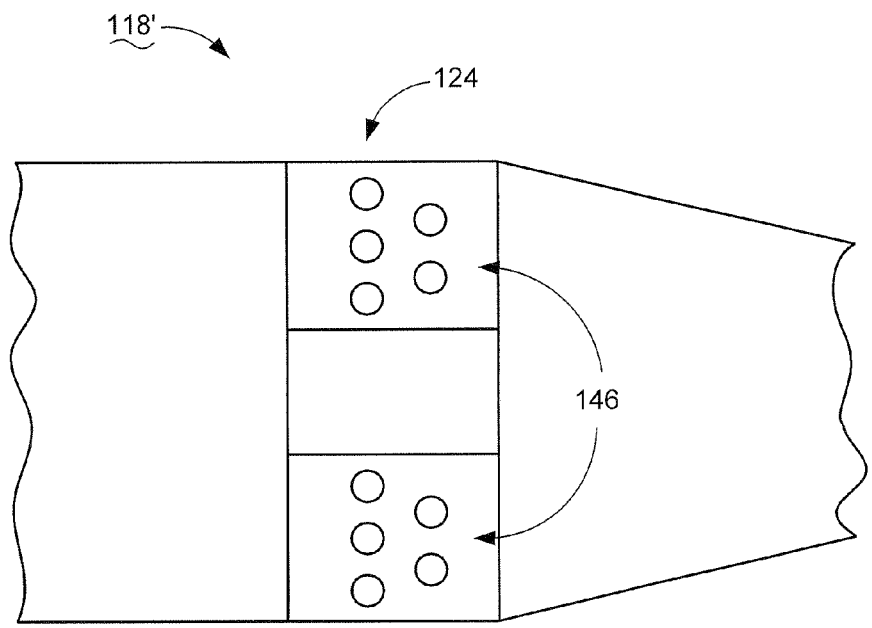
FIG. 5 is an enlarged detail view of a portion of a comparative flexible suspension defining same-sized stiffness-reducing features.

Generally, the relatively stiffer edges of the bend section 124 serve to maintain higher resonant frequencies in comparison to the suspension 118' of FIG. 5 having an array 146 of equivalently sized features, which provides a substantially constant stiffness across the width of the bend section 124. More particularly, the vertical stiffness is a function of the moment of inertia around the y-axis (see FIG. 2). The y-axis plane is parallel to the bend section width 124, so the position of the stiffness-reducing features along the width of the suspension load beam 126 is not a factor in the moment of inertia associated with the vertical stiffness. However, the sway stiffness and torsional stiffness are functions of the moments of inertia around the z-axis and x-axis, respectively. The relatively stiffer outer extremities of the suspension load beam 126 yield greater moments of inertia, corresponding to the improved stiffness and resonant performance of the embodiments of the present invention.

By sequentially decreasing the size of the stiffness-reducing features as in FIG. 4, it has been observed that a bend section 124 thickness can be optimized for the desired sway and torsional stiffness. The stiffness-reducing features can then be imparted without significantly reducing the sway and torsional stiffness quality. This solution permits the use of a thicker bend section 124 in comparison to other attempted solutions.

Figure 6:
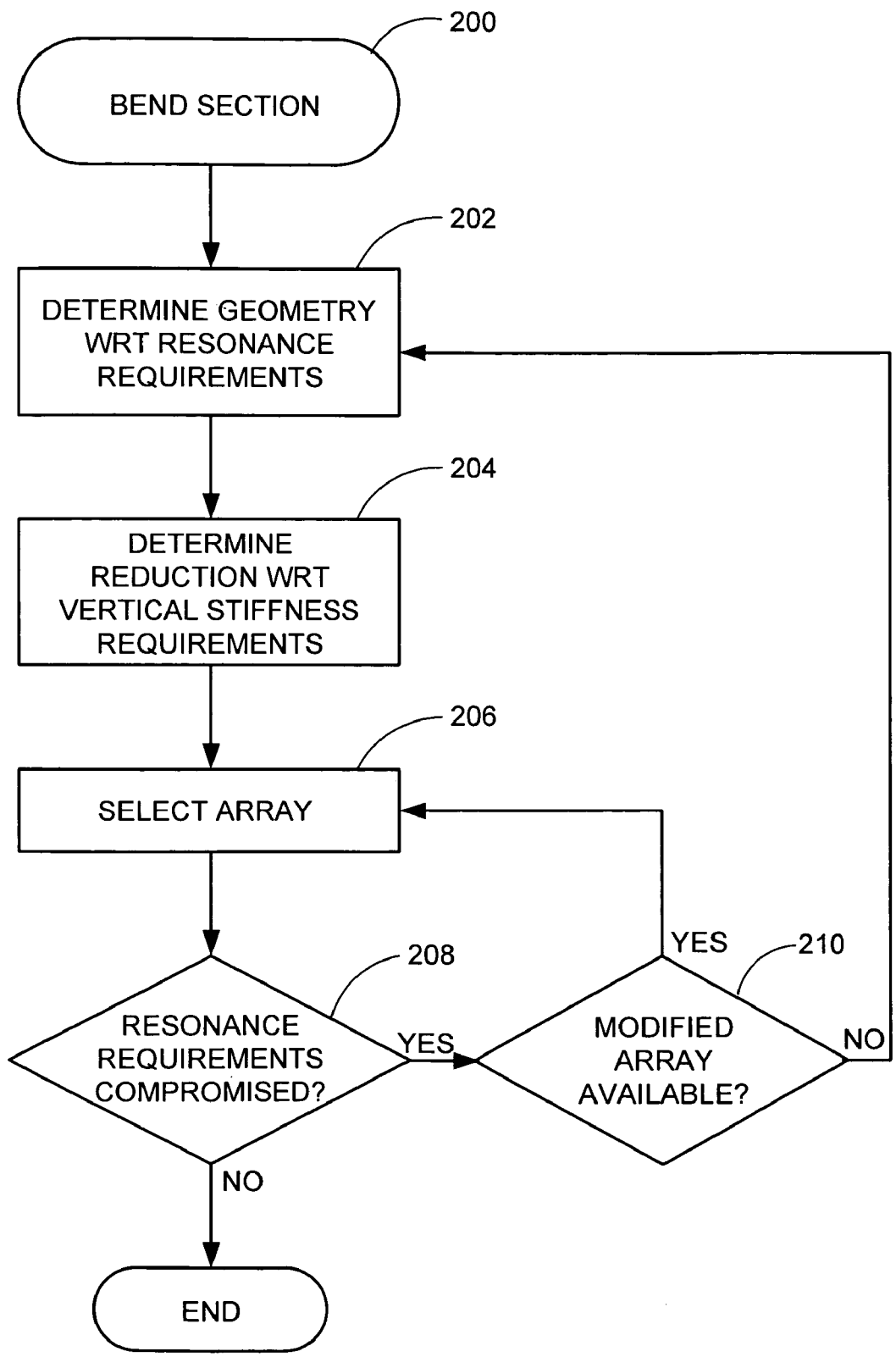
FIG. 6 is a flowchart illustrating steps for performing a method for designing a bend section in accordance with embodiments of the present invention.

FIG. 6 is a flowchart illustrating steps of a method 200 for optimizing the bend section 124 arrangement; that is, to maximize resonant frequencies while minimizing the spring rate. The method 200 begins in block 202 by assigning a geometry, that is a length, width, and thickness of the struts 125 that will provide the desired sway stiffness and torsional stiffness without regard to any stiffness-reducing features. In block 204 it is determined the volume of cross-sectional thickness that must be reduced, considering the thickness determined in block 202, in order to achieve a desired vertical stiffness. In block 206 the volume determined in block 204 is assigned to an array of a plurality of stiffness-reducing features of sequentially smaller size, the largest disposed nearer the bend section centerline 132, and arranged substantially equidistantly within each strut 125 of the bend section 124.

In determination block 208 it is ascertained whether the selected array effectively compromises the resonance requirements satisfied in block 202. If the determination of block 208 is no, then the method successfully ends; if the determination is yes, then control passes to determination block 210. In determination block 210 it is ascertained whether the array can be modified, such as changing the size, position, or number of stiffness-reducing features. If the determination of block 210 is no, the control returns to block 202 where the geometry is modified; if the determination is yes, then control returns to block 206 where the array is modified.

Summarizing, the embodiments of the present invention generally contemplate an actuator load beam (such as 126) comprising a preload bend section (such as 124) defining an array (such as 130) of differently configured stiffness-reducing features. The bend section can comprise a reduced thickness in comparison to a portion of the load beam adjacent the bend section notwithstanding the stiffness-reducing features. The bend section can define a central aperture (such as 128) between opposing struts (such as 125), and as such none of the stiffness-reducing features coincide with a longitudinal centerline (such as 132) of the load beam.

The stiffness-reducing features are characteristically sized in inverse relation to a respective distance from the longitudinal centerline. That is, the features can be disposed in an array of sequentially smaller sizes, with the largest of the array disposed adjacent an edge of the spring strut nearest to the longitudinal centerline of the actuator load beam at the preload bend section. Preferably, the array defines a mirror image around the beam longitudinal centerline.

For increasing the packing density, the array can define stiffness-reducing features on each of two or more planes (such as 134, 136) extending substantially transverse to the longitudinal centerline. The stiffness-reducing features can be provided as detents extending partially through the bend section, or can be apertures in the bend section, as can be produced such as by etching processes.

A method for optimizing the bend section design is provided comprising steps of: determining a thickness of a preload bend section for an actuator load beam associated with a desired resonant performance (such as 202); determining a volume of stiffness-reducing features in the preload bend section associated with a desired vertical stiffness (such as 204); and arranging an array of stiffness-reducing features associated with the determined volume in an array of sequentially smaller size with the largest size of the array nearest to a longitudinal centerline of the actuator load beam at the preload bend section (such as 206).

The arranging step can comprise disposing the array along two or more planes extending substantially transversely to the longitudinal centerline of the actuator load beam at the bend section. The arranging step can furthermore be characterized by stiffness-reducing features defining apertures in the preload bend section.

A data storage device is provided comprising an actuator in combination with a data storage medium, and means for positioning the actuator in an operable data storing and data retrieving relationship with the data storage medium. The means for positioning can be characterized by reducing a stiffness of a preload bend section of the actuator in an array of stiffness-reducing features. The means for positioning can further be characterized by varying the sizes of the stiffness-reducing features. The means for positioning can further be characterized by sequentially sizing the stiffness-reducing features from largest to smallest with the largest nearest a centerline of the actuator at the preload bend section.

For purposes of the description and the appended claims, the phrase "means for positioning" shall not be interpreted to include as equivalents any prior art structures that have substantially constant stiffness across the articulating portion of the load beam, such as prior art structures with solid bend struts or with only one stiffness-reducing feature in the strut, or with multiple thickness-reducing features of the same size.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. An actuator load beam comprising a preload bend section defining an array of stiffness-reducing features, that sequentially decrease in size in relation to a respective distance of the features from a longitudinal centerline of the actuator load beam at the preload bend section with a largest of said features in the array being nearest the longitudinal centerline, wherein the preload bend section defines a central opening between opposing spring strut members, and the stiffness-reducing features provide the strut members with a variable stiffness that decreases in a direction toward the longitudinal centerline.

2. The actuator load beam of claim 1 wherein the smallest of said features is farthest from the longitudinal centerline, and at least one of the features is disposed between said largest and said smallest features and has a feature size that is smaller than the largest feature and larger than the smallest feature.

3. The actuator load beam of claim 1 wherein the array forms a mirror image about the longitudinal centerline.

4. The actuator load beam of claim 1 wherein the stiffness-reducing features provide a higher stiffness to each of the strut members along an outermost edge thereof and a smaller stiffness to each of the strut members along an innermost edge thereof closest to the longitudinal centerline.

5. A method comprising:
  determining a thickness of a preload bend section for an actuator load beam associated with a desired resonant performance, the preload bend section having opposing spring strut members;
  determining a volume of stiffness-reducing features in the preload bend section associated with a desired vertical stiffness;
  arranging an array of at least three stiffness-reducing features associated with the determined volume in an array of sequentially smaller size with the largest size of the array disposed nearest to a longitudinal centerline of the actuator load beam at the preload bend section, the stiffness-reducing features providing a variable stiffness across the strut members.

6. The method of claim 5 wherein the arranging step comprises disposing the array along two or more planes extending substantially transversely to the longitudinal centerline of the actuator load beam at the preload section.

7. The method of claim 5 wherein the arranging step is characterized by stiffness-reducing features defining apertures in the preload bend section.

8. An apparatus comprising a load beam supported by a pair of spring strut members on opposing sides of a longitudinal centerline of the load beam, each said strut member comprising a sequence of stiffness-reducing features arranged in spaced-apart relation along a transverse plane normal to the longitudinal centerline, a first feature of each said sequence closest to the longitudinal centerline having a largest feature size, a second feature of each said sequence closest to an outermost edge of the associated strut member having a smallest feature size, and a third feature of each said sequence between the first and second features having an intermediate feature size smaller than said largest feature size and larger than said smallest feature size.

9. The apparatus of claim 8, wherein the transverse plane is a first plane, and each said strut member further comprises a second sequence of stiffness-reducing features arranged in spaced apart relation along a second transverse plane parallel to the first plane, a fourth feature of each said second sequence having a feature size between the respective sizes of the first and third features, and a fifth feature of each said second sequence having a feature size between the respective sizes of the second and third features.

10. The apparatus of claim 9, wherein each said feature is a different respective distance from the longitudinal centerline and has a corresponding feature size inversely proportional to said respective distance.

11. The apparatus of claim 8, wherein the respective sizes of the stiffness-reducing features are selected in relation to a thickness of the strut members to maintain a desired level of sway stiffness and torsion stiffness of the load beam and to reduce a vertical stiffness of said load beam.

12. The apparatus of claim 8, wherein each of the first, second and third features are characterized as apertures which extend completely through an overall thickness of the strut members, the first feature having a largest overall diameter, the second feature having a smallest overall diameter, and the third feature having an intermediate overall diameter.

13. The apparatus of claim 8, wherein each of the first, second and third features are sized to provide relatively higher stiffness of the strut members adjacent said outermost edges thereof and to provide relatively lower stiffness of said strut members adjacent said longitudinal centerline.

14. The apparatus of claim 8, wherein each of the first, second and third features are characterized as cavities which extend partially into an overall thickness of the strut members to different depths thereof.

15. The apparatus of claim 8, wherein each of the first, second and third features sizes are characterized as forming a circle.

16. The apparatus of claim 8, wherein the first, second and third features are sized to provide each of the strut members with variable stiffness in a direction normal to the longitudinal centerline.

* * * * *